United States Patent [19]

Chua et al.

[11] Patent Number: 5,352,546
[45] Date of Patent: Oct. 4, 1994

[54] HIGH RATE ELECTROCHEMICAL CELL

[75] Inventors: David L. Chua, Wayne, Pa.;
Hsiu-Ping Lin, Princeton, N.J.;
Rebecca A. Smith, Chalfont, Pa.

[73] Assignee: Alliant Techsystems Inc., Hopkins, Minn.

[21] Appl. No.: 29,080

[22] Filed: Mar. 10, 1993

[51] Int. Cl.$^5$ .................. H01M 6/14; H01M 4/58
[52] U.S. Cl. .................. 429/101; 429/196; 429/197; 429/218; 429/223
[58] Field of Search ............... 429/196, 101, 197, 218, 429/223

[56] References Cited

U.S. PATENT DOCUMENTS

| | | |
|---|---|---|
| Re. 30,661 | 6/1981 | Eisenberg ................ 429/197 X |
| 4,397,921 | 8/1983 | Xenzhek et al. ........... 429/197 X |
| 4,476,204 | 10/1984 | Auborn ..................... 429/196 |
| 4,891,281 | 1/1990 | Kuo et al. ................. 429/196 X |
| 4,902,588 | 2/1990 | Chang et al. .............. 429/196 X |
| 5,147,739 | 9/1992 | Beard . |

*Primary Examiner*—John S. Maples
*Attorney, Agent, or Firm*—Haugen and Nikolai

[57] ABSTRACT

An active metal non-aqueous electrochemical cell includes an anode selected from lithium metal and intercalated lithium compounds, an electrolyte system consisting essentially of an $SO_2$ solvent containing an amount of electrolyte salt, and a solid liquid or gaseous cathode active material selected from a class of materials which are reduced in preference to $SO_2$, wherein the amount of cathode material is generally limiting with respect to the desired discharge reaction.

9 Claims, 1 Drawing Sheet

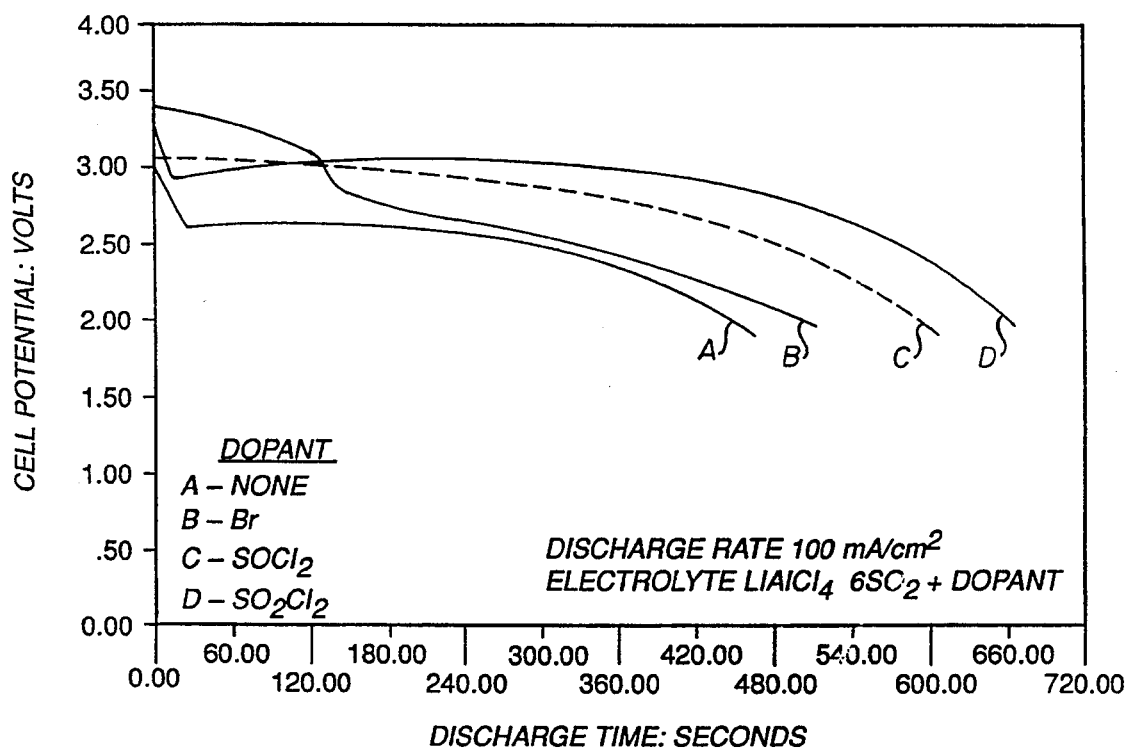

HIGH RATE ELECTROCHEMICAL CELL

BACKGROUND OF THE INVENTION

I. Field of the Invention

The present invention is directed generally to primary or secondary, non-aqueous electrochemical cells or batteries of either active or reserve types. More particularly, the invention is directed to improvements in the high discharge rate performance of such cells including improvements in cell safety based on the use of sulfur dioxide ($SO_2$) as the solvent in an inorganic electrolyte combination with liquid or gaseous cathode material such as the oxyhalides thionyl chloride ($SOCl_2$) and sulfuryl chloride ($SO_2Cl_2$) as the cathode active material. The amount of cathode active material in the electrolyte system is usually sufficient only to sustain the needed electrochemical reaction, and can be entirely consumed during normal discharge of the cell, thereby reducing the amount of highly reactive residual components to a safe level.

II. Related Art

Non-aqueous active metal cells have been in use for some time. They have enabled those skilled in the art to achieve much greater energy densities or energy to weight ratios than had been possible with other electrochemical couples. The wide range of potential uses for these cells has led to a great deal of interest in improving the performance and safety of the cells so that they may be used in a greater number of applications.

Cells of this class normally consist of a light, strongly reducing anode, normally an alkali metal such as lithium (Li) or an alkaline earth metal such as magnesium (Mg) or calcium (Ca), an aprotic, non-aqueous liquid solvent/depolarizer into which an appropriate quantity of an electrolyte salt of the anode metal has been dissolved to form a conductive electrolyte solution together, with an oxidizing agent as the cathode material. Active metal-oxyhalide systems, and particularly lithium systems, which include an electrolyte salt dissolved in an electrolyte solvent including thionyl chloride ($SOCl_2$) or sulfuryl chloride ($SO_2Cl_2$) are among the highest energy density cells achieved to date by any electrochemical power source. It has also been found that the discharge rate efficiency of the Li/$SOCl_2$ or $SO_2Cl_2$ cells can be even further increased by the addition of halogen compounds such as bromine ($Br_2$) and interhalogen compounds such as BrCl, particularly in combination with $SO_2$.

In the case of liquid or gaseous cathode reactions, however, the oxyhalide materials used are typically very reactive and present a cell safety problem particularly when present in an abundant quantity, as when they are also used as the electrolyte solvent/depolarizer. In these embodiments, a significant amount of the oxyhalide material is present in both the charged and discharged battery states making even the discharged cells potentially hazardous. In some of these cells $SO_2$ may be present in smaller quantities as a dopant or additive rather than as the electrolyte solvent itself. For some time in the art, there has been a definite need to reduce the relative amounts of these high materials in the cells. There has been a need for a very high rate electrochemical cell which uses a relatively benign supporting electrolyte and cathode materials that are either close to or fully consumable as a minor constituent in the electrochemical system or consist of relatively non-hazardous materials in a solid form suitable for rechargeable or secondary cells. It would represent a great advantage if the presence of highly reactive materials could be minimized in the discharged cell without any sacrifice in cell discharge rate capability.

Accordingly, it is an object of the present invention to provide a very high discharge rate active or reserve, non-aqueous primary or secondary cell having an active metal anode and an electrolyte solvent/depolarizer/cathode combination in which the highly reactive materials are essentially fully consumed upon discharge of the cell or reduced to a level that renders the discharged cell safe.

Another object of the present invention is to achieve very high cell discharge rates in a non-aqueous inorganic electrochemical system in which highly reactive liquid or gaseous cathode reactants are not used as the principal electrolyte solvent.

A further object of the invention is the provision of a very high discharge rate electrochemical cell using an inorganic electrolyte consisting of sulfur dioxide ($SO_2$) together with one or more salts of the anode metal in which the $SO_2$ electrolyte system virtually does not participate in the cell reactions.

A still further object of the invention is to provide a high amperage non-aqueous inorganic cathode limited cell.

Yet another object of the invention is to provide a relatively safe, high discharge rate non-aqueous electrochemical cell capable of sustaining 100 mA/$cm^2$ for a 10-minute or greater life.

Yet still another object of the present invention is to provide an electrochemical cell using an inorganic electrolyte consisting essentially of sulfur dioxide ($SO_2$) as the solvent together with one or more lithium salts, in which the electrolyte serves only as an ionic conductor, in combination with a solid cathode reactant such as a lithium intercalation compound in either a primary or rechargeable electrochemical cell.

Other objects and advantages will become apparent to those skilled in the art based on the further descriptions of the invention contained herein.

SUMMARY OF THE INVENTION

In accordance with the present invention, many of the problems discussed above with regard to prior high-discharge rate nonaqueous primary and rechargeable electrochemical cells are solved. The present invention eliminates many of the dangers associated with the presence of highly reactive materials in large amounts in charged cells and in discharged cells without sacrificing high discharge rates. The cells sustain discharge rates equal or greater than 100 mA/$cm^2$ for as much as 10 minutes or longer. As used herein, the terms "rate" or "discharge rate" refer to instantaneously available power regardless of total cell capacity. "Total cell capacity" refers to the total energy available from a given cell regardless of discharge time or amperage.

The unique electrochemical cell of the invention includes an inorganic electrolyte based on sulfur dioxide ($SO_2$) as the solvent containing one or more salts of the anode metal. Using a lithium anode, dissolved lithium salt such as LiAlCl$_4$, lithium bromide (LiBr), LiAsF$_6$, LiBF$_4$ and other such salts or their combinations are used. The function of the $SO_2$ in the electrolyte system of the invention is generally intended only to support ionic conduction and it is used partly because of its inherent high solution conductivity.

The use of sulfur dioxide as the basis for the electrolyte enables oxyhalide materials and additives to be used in lesser amounts to make the cell cathode limited. Any desired cathode active material or cathode active material dopant combination that will work may be used so long as it is chemically compatible and is reduced in preference to $SO_2$ in the cell reaction.

One embodiment combines the $SO_2$ based electrolyte with liquid or gaseous cathode materials such as the oxyhalides, $SOCl_2$ and $SO_2Cl_2$, and minor amounts of halogens ($Cl_2$, $Br_2$ and $I_2$) as dopants to form a high rate electrochemical cell with active metal anode electrodes such as alkali metals, preferably Li, or alkaline earth metals including Mg, Ca and other suitable materials known to those skilled in the art. In accordance with the invention, the amount of cathode materials added to the electrolyte system need be sufficient only to sustain the needed electrochemical discharge reaction and are intended to be nearly or fully consumed upon discharge of the cell. This eliminates the danger from residual very reactive cathode constituents in the discharged cell. It avoids entirely the safety problems which occur when these materials are present in larger quantities as they are when used as the solvent/depolarizer materials as has commonly been done in prior cells.

In another embodiment, the $SO_2$-based, lithium salt electrolyte may be used in combination with solid cathode reactants such as $Li_xCoO_2$ ($0.4 \leq X \leq 1.0$), $LiNiO_2$, $V_2O_5$ or any other suitable transition metal oxide or any lithiated manganese dioxide materials constitute a very high rate primary or rechargeable electrochemical cell.

BRIEF DESCRIPTION OF THE DRAWINGS

In the drawings:

The lone FIGURE is a series of plots of cell performance at a 100 mA/cm$^2$ discharge rate of one electrolyte system showing the effect of various cathode dopants.

DETAILED DESCRIPTION

The electrochemical cells of the invention represent a significant boost in discharge rate capabilities for inorganic active metal, particularly including lithium, non-aqueous cells and batteries. By limiting the concentrations of highly active oxyhalide materials, the cells can be fabricated to be generally cathode limiting and so much safer. Improvements both in operating current density or discharge rate and in the time in which the high discharge rate can be sustained have also been achieved. Cells able to sustain discharge rates between 100 mA/cm$^2$ to 125 mA/cm$^2$ for 10 or more minutes have been produced. Of course, applications needing shorter duration and power will tolerate even higher discharge rates. Both primary and secondary (rechargeable) embodiments are contemplated and, in addition to active batteries, the system can be used on reserve cells.

Whereas lithium is the preferred material for the anode, or negative electrode, the invention includes cells using other active metal materials as anodes. In this regard, the term "active metals" is meant to include alkali metals together with alkaline earth metals and lithium intercalation compounds and carbon. Although the specific preferred embodiments may be described particularly in regard to the use of lithium, it is to be understood that the use of other anode materials may occur to those skilled in the art. The use of intercalated lithium compounds as the anode in the electrochemical cells of the invention is more fully described in U.S. Pat. No. 5 147 739 and U.S. Pat. No. 5,284,721, both of which are assigned to the same assignee as the present invention, and to the extent additional information is required for this application, it is deemed incorporated by reference herein. It will further be appreciated that the anodes can be used on a stand-alone basis or incorporated in a polymer base matrix in accordance with the particular application of the cell.

The electrolyte of the invention is one dominated by $SO_2$ as the electrolyte solvent and contains a salt or salts of the anode material which, in the case of lithium, include amounts of materials such as $LiACl_4$, $LiBr$, $LiASF_6$, $LiBF_4$, etc., or combinations of them. The cell is designed such that it takes advantage of the high solution conductivity of sulfur dioxide ($SO_2$) but utilizes the $SO_2$ in terms of supporting high ionic conduction for very high rate applications of the cells.

Any compatible liquid or gaseous cathode material may be used in conjunction with the liquid $SO_2$ solvent; however, the cathode material must be one that is reduced in preference to the $SO_2$, although the $SO_2$ may also be protected from reduction by the use of preferentially reduced active dopant materials.

The basic electrolyte system can be used in cell embodiments having either a liquid or a gaseous/liquid cathode active material or solid cathode reactants. Liquid cathode active materials include $SOCl_2$ and $SO_2Cl_2$, which are employed in quantities sufficient only to sustain the needed electrochemical reaction thereby making the cell cathode-limited. The $SOCl_2$ or $SO_2Cl_2$ can be utilized with dopant materials selected from halogen compounds $Cl_2$, $Br_2$ and $I_2$, or possibly interhalogen compounds such as $BrCl$. Another interhalogen compound, $BrF_3$, while notoriously corrosive, and known for producing cell passivation when used as a main solvent/depolarizer, may be successfully used as a dilute dopant. The liquid or gaseous cathode reactants can also be used in a cell wherein the anode is magnesium, calcium, or other alkaline earth metal.

It should be noted that, unlike prior high-rate cells which utilized $SOCl_2$ or $SO_2Cl_2$ as the primary solvent/depolarizer, in the case of the cells of the present invention, the cathode materials are fully or essentially fully consumed or at least reduced to a level that renders the discharged electrochemical cell substantially free of the highly reactive oxyhalide materials and thus much safer. In the prior cells where large amounts of $SOCl_2$ or $SO_2Cl_2$ remained even after the cells was fully discharged, an explosion hazard still existed which severely limited the scope of cell usage.

The electrolyte system also can be used in combination with solid cathode materials such as $Li_xCoO_2$ ($0.4 \leq X \leq 1.0$), $LiNiO_2$, $V_2O_5$, $V_6O_{13}$ or any of many other transition metal oxides, or any of the many lithiated magnesium dioxide materials. These solid cathode materials can also be used in combination with anodes made of materials such as magnesium and calcium in addition to lithium to constitute high rate primary and rechargeable electrochemical cells. Such additional materials are discussed in greater detail in the above-referenced U.S. Pat. No. 5,147,739 and application Ser. No. 07/561,132.

It should be kept in mind, however, that the particular electrochemical couple chosen must produce sufficient cell potential that the cathode material is reduced in preference to $SO_2$ during cell operation. This generally requires operation at a cell potential above about 2.8 volts. The Figure together with the summarizing data of Table I show a comparison of discharge plots at 100 mA/cm$^2$ for an electrolyte system in accordance with the invention using various dopants or, in the case of plot A, no dopant at all. As shown therein, the SO$_2$Cl$_2$ doped system (D) remained at or above 3.0 volts for 210 seconds and the Br$_2$ doped systems for 129. All dopant species yielded increased discharge life in the 3.0 volt to 2.5 volt interval and showed a decided discharge life advantage over a doped SO$_2$Cl$_2$ solvent/depolarizer based system listed at the top of Table I. That system, of course, has the added problem of residual SO$_2$Cl$_2$ overcome by the system of the present invention. In all cases the operating time afforded above about 2.8 volts with the SO$_2$ based system has been found to be satisfactory with respect to most applications and the discharged cell is generally much safer. The discharge time to 2.0 volts is also greatly increased; however, below about 2.8 volts and especially below 2.5 volts some reduction of SO$_2$ will occur.

Of course, other combinations can be used and the particular illustrated combinations are meant to be merely exemplary.

TABLE I

| Cell Performance at 100 mA/cm$^2$ Discharge Rate | | | | |
|---|---|---|---|---|
| Electrolyte Solution | | Run Time (sec) to Cutoff Voltages of | | |
| Base | Dopant | 3.0V | 2.5V | 2.0V |
| 1.5M LiAlCl$_4$/SO$_2$Cl$_2$ | Br$_2$ + SO$_2$ | 220 | 238 | 245 |
| LiAlCl$_4$.6SO$_2$ | — | 2 | 313 | 465 |
| LiAlCl$_4$.6SO$_2$ | Br$_2$ | 129 | 357 | 517 |
| LiAlCl$_4$.6SO$_2$ | SOCl$_2$ | 8 | 492 | 604 |
| LiAlCl$_4$.6SO$_2$ | SO$_2$Cl$_2$ | 210 | 590 | 668 |

Thus, discharge rates of 100–125 mA/cm$^2$ can be sustained typically for as long as 10 or more minutes depending on voltage cutoffs. Higher rates may be achievable for shorter periods of discharge. This is comparable to less than 100 mA/cm$^2$ or an abrupt voltage drop off associated with SOCl$_2$ or SO$_2$Cl$_2$ based electrolyte solvent systems.

The SO$_2$Cl$_2$ doped SO$_2$ system achieves comparable run time at 3.0 volts or above with the So$_2$Cl$_2$ based system and a much longer time between 3.0 volts and 2.5 volts. The 1.5M LiAlCl$_4$/SO$_2$Cl$_2$, Br+SO$_2$ doped electrolyte shown in Table I is, for example, a superior SO$_2$Cl$_2$ system and, as per Table I, output drops off rapidly in potential from 3.0 to 2.0 between 220 and 245 seconds.

It will be appreciated that an important aspect of the invention is the provisions of a relatively safe cell which can sustain a very high discharge rate. The electrochemical system of the invention can achieve discharge rates comparable or superior to oxyhalide systems without the safety hazards associated with the oxyhalide based systems. The highly reactive constituents, i.e., SOCl$_2$, SO$_2$Cl$_2$, etc., are never present in large quantities and are either depleted or so reduced in concentration as to render the cell quite harmless upon discharge.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

We claim:

1. A non-aqueous electrochemical cell comprising:
   (a) an anode selected from lithium metal and intercalated lithium compounds;
   (b) an electrolyte system including SO$_2$ solvent containing electrolyte salt;
   (c) a liquid or gaseous cathode material that is reduced in preference to SO$_2$, selected from the group consisting of oxyhalides including SO$_2$Cl$_2$ and SOCl$_2$, wherein the amount of cathode material is such that it is essentially consumed during a designed normal cell discharge reaction cycle in a manner that renders the cell cathode-limited.

2. The electrochemical call of claim 1 wherein the cathode material is selected from the group consisting of SO$_2$Cl$_2$ and SOCl$_2$.

3. The electrochemical cell of claim 1 further comprising additional dopant materials in the electrolyte solution selected from halogen and interhalogen compounds.

4. The electrochemical cell of claim 2 further comprising additional dopant materials in the electrolyte solution selected from halogen and interhalogen compounds.

5. The electrochemical cell of claim 1 wherein the electrolyte salt is selected form LiAlCl$_4$, LiBr, LiAsF$_6$, LiBF$_4$, or combinations thereof.

6. The electrochemical cell of claim 4 wherein the electrolyte salt is selected form LiAlCl$_4$, LiBr, LiAsF$_6$, LiBF$_4$, or combinations thereof.

7. The electrochemical cell of claim 1 wherein the cell is a reserve cell.

8. A non-aqueous electrochemical cell comprising:
   (a) an anode including lithium or a reversible lithium intercalation material;
   (b) an electrolyte system including SO$_2$ solvent and an electrolyte salt selected from the group consisting of lithium salts and combinations thereof;
   (c) a solid cathode reactant material that is reduced in preference to SO$_2$ and selected from the group consisting of Li$_x$CoO$_2$ ($0.4 \leq X \leq 1.0$), LiNiO$_2$, V$_2$O$_5$, a transition metal oxide, or any lithiated manganese dioxide material, wherein the amount of cathode material is such that it is essentially consumed during a designed normal cell discharge reaction cycle in a manner that renders the cell cathode-limited.

9. The electrochemical cell of claim 8 wherein the cell is a reserve cell.

* * * * *

UNITED STATES PATENT AND TRADEMARK OFFICE
CERTIFICATE OF CORRECTION

PATENT NO. : 5 352 546
DATED : October 4, 1994
INVENTOR(S) : David L. Chua et al It is certified that error appears in the above-indentified patent and that said Letters Patent is hereby corrected as shown below:

In column 6, line 23, delete "call" and insert -- cell -- .

In column 6, line 50, delete "LINiO$_2$" and insert -- LiNiO$_2$ -- .

Signed and Sealed this

Twenty-second Day of November, 1994

Attest:

BRUCE LEHMAN

Attesting Officer

Commissioner of Patents and Trademarks